United States Patent [19]

Lawrence et al.

[11] Patent Number: 4,831,637
[45] Date of Patent: May 16, 1989

[54] APPARATUS AND TECHNIQUE FOR TIMING JITTER CANCELLATION IN A DATA RECEIVER

[75] Inventors: Victor B. Lawrence, Holmdel, N.J.; Edward A. Lee, Berkeley, Calif.

[73] Assignees: American Telephone and Telegraph Company, New York, N.Y.; AT&T Information Systems Inc., Morristown, N.J.

[21] Appl. No.: 622,139

[22] Filed: Jun. 19, 1984

[51] Int. Cl.[4] .......................... H03D 1/06; H04L 7/02
[52] U.S. Cl. ....................................... 375/118; 375/99; 328/162; 307/269
[58] Field of Search ...................... 375/118, 12, 14, 15, 375/39, 99, 102, 95, 106, 120, 119; 333/18; 328/162, 151, 167, 72; 307/269, 271

[56] References Cited

U.S. PATENT DOCUMENTS

| | | | |
|---|---|---|---|
| 3,906,347 | 9/1975 | Motley et al. | 375/39 |
| 4,039,748 | 8/1977 | Caron et al. | 375/110 |
| 4,061,978 | 12/1977 | Motley et al. | 375/99 |
| 4,091,331 | 5/1978 | Kaser et al. | 375/99 |
| 4,245,345 | 1/1981 | Gitlin et al. | 375/13 |
| 4,253,184 | 2/1981 | Gitlin et al. | 333/18 |
| 4,308,618 | 12/1981 | Levy et al. | 375/99 |
| 4,309,770 | 1/1982 | Godard | 333/18 |
| 4,334,313 | 6/1982 | Gitlin et al. | 333/18 |
| 4,530,104 | 7/1985 | Kamerman | 375/99 |

OTHER PUBLICATIONS

"Timing Recovery and Scramblers in Data Transmission", BSTJ, Mar. 1975, pp. 569–593, R. D. Gitlin, J. F. Hayes.

Primary Examiner—Robert L. Griffin
Assistant Examiner—Marianne Huseman
Attorney, Agent, or Firm—Barry H. Freedman; David R. Padnes

[57] ABSTRACT

A data receiver which includes a timing recovery circuit or periodically adjusting a timing signal used to control sampling of the received signal is arranged to reduce or eliminate phase jitter introduced as a result of the adjustments. Apparatus and a method are described for forming a correction factor which is a joint function of the timing adjustment increment and a previous correction factor. Typically, correction is accomplished by forming the complex product of the in-phase and quadrature-phase components of the received signal and the recursively updated correction factor.

14 Claims, 4 Drawing Sheets

RECEIVER

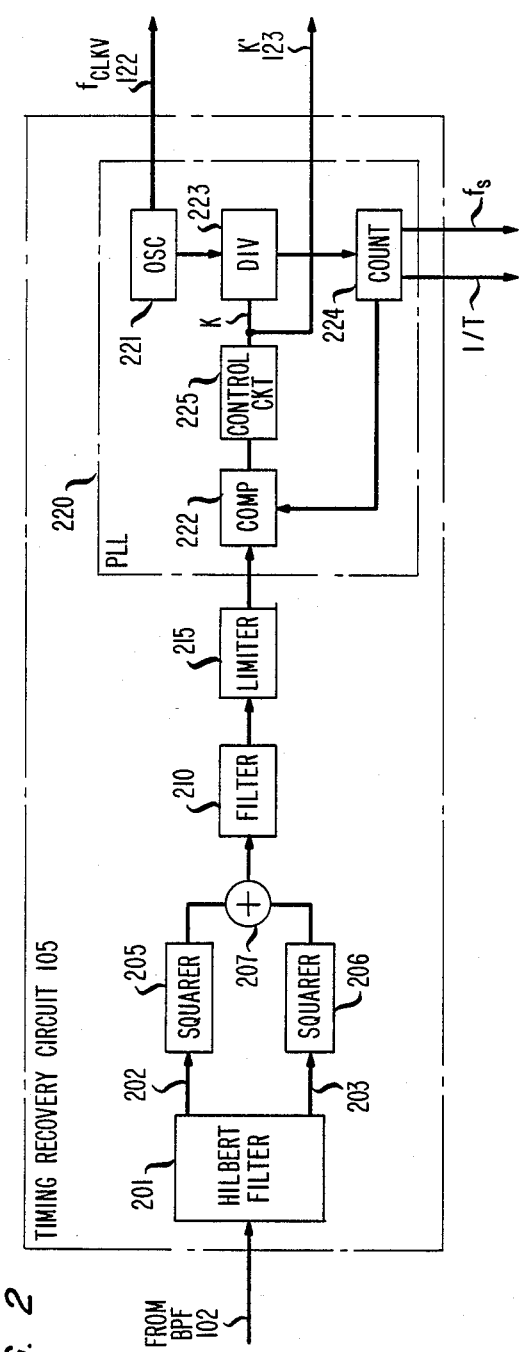
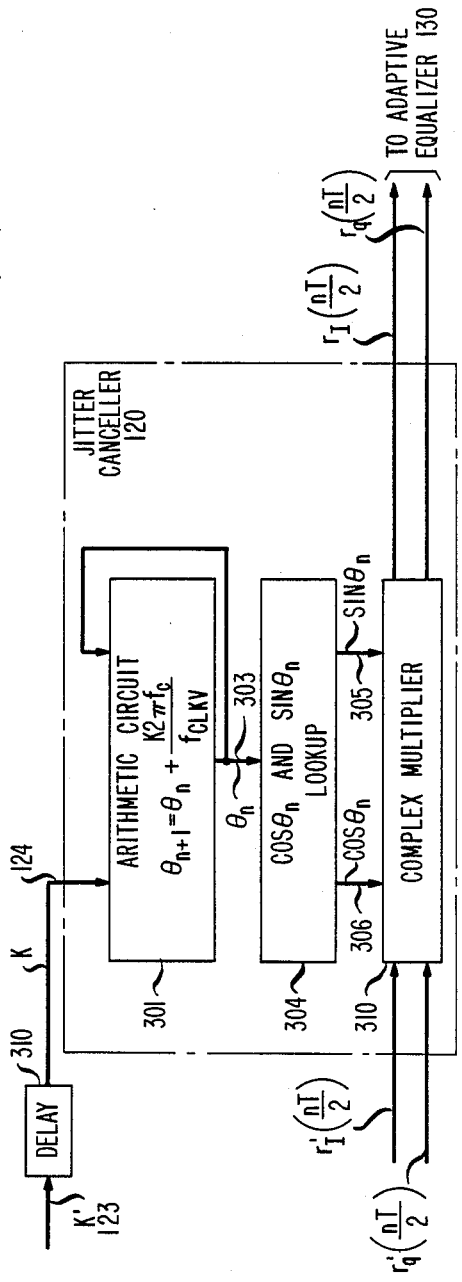
FIG. 2
FIG. 3

RECEIVER
WITHOUT
CORRECTION

RECEIVER WITH CORRECTION

BIT ERROR RATE (BER) TESTS WITH AND WITHOUT TIMING JITTER CANCELLATION

APPARATUS AND TECHNIQUE FOR TIMING JITTER CANCELLATION IN A DATA RECEIVER

FIELD OF THE INVENTION

The present invention relates generally to a receiver for digital data transmission which includes a timing recovery circuit, and, in particular, to a technique and apparatus for cancelling timing jitter occurring in such a receiver.

BACKGROUND OF THE INVENTION

In a receiver designed to recover customer data from a digital data signal transmitted via a transmission medium, it is well known that timing recovery must be employed to correctly identify the appropriate instants (sometimes called the "timing epoch") at which the received signal must be sampled. This is because the frequencies of the transmitter and receiver clocks invariably differ from one another, if only by a very small amount. Over time, this frequency difference, if not compensated for, would cause the received signal to be sampled further and further away from the appropriate time poits, i.e., with an increasingly erroneous timing epoch. As long as the sampling frequency is high enough, provision of an adaptive equalizer within the receiver might compensate for this clock frequency difference (as long as it is not too large) via the coefficient update process. However, this is not an effective long-term solution, because the distribution of coefficient values will eventually become skewed to one end of the coefficient queue, and equalizer performance will degrade sharply.

To deal with this problem, the receiver is conventionally provided with a timing recovery circuit which determines whether the line samples are being formed earlier or later than they should be and, in response, adjusts the phase of a receiver clock in the appropriate direction. This phase adjustment process is referred to as retarding or advancing the receiver timing or, alternatively, as retarding or advancing the sampling phase. The amount by which the receiver clock is advanced or retarded is referred to herein as the timing adjustment increment.

One commonly used timing recovery technique is the so-called envelope-derived timing recovery, disclosed, for example, in the *Bell System Technical Journal*, Vol. 54, p. 569 et seq, March, 1975. This technique extracts a symbol-rate tone from the received signal and uses the phase of that tone to control receiver timing. An alternative timing recovery technique is referred to as "coefficient tracking," and uses information derived from the equalizer. See, for example, U.S. Pat. No. 4,245,345 issued to R. D. Gitlin et al, Jan. 13, 1981.

During timing recovery using any of the known techniques, advancing or retarding the receiver clock by the timing adjustment increment is perceived by the remaining circuitry within the receiver as a phase error or "jitter" which can lead to degradation in the signal-to-noise ratio or "gain" achieved in the remaining receiver circuits.

In view of the foregoing, it is the broad object of the present invention to improve the performance of a receiver for digital data transmission in which a timing recovery circuit is used to determine appropriate sampling instants for the received signal. In particular, it is desired to remove or reduce the effects of phase error or timing jitter introduced during the timing recovery process.

SUMMARY OF THE INVENTION

In accordance with the present invention, a data receiver includes a jitter cancellation circuit arranged to receive samples representing the in-phase and quadrature-phase components of the input signal sampled at instants by a timing recovery circuit. The jitter cancellation circuit also receives an input from the timing recovery circuit indicative of the timing adjustment increment applied to the receiver clock disposed within the timing recovery circuit. Phase jitter introduced in the receiver by the timing recovery circuit is then reduced or eliminated by correcting each received sample in accordance with a correction factor which is a joint function of the timing adjustment increment and a previous correction factor. Typically, correction is accomplished by forming the complex product of the in-phase and quadrature-phase components of the input signal and the recursively updated correction factor; the resulting corrected samples can then be used in the equalizer or other remaining portions of the receiver.

The timing jitter canceller is easily implemented in integrated circuit form; alternatively, jitter cancellation can be accomplished in a general purpose signal processor or a microprocessor by appropriate modifications to its control algorithms.

BRIEF DESCRIPTION OF THE DRAWING

The present, invention will be fully appreciated by reference to the following detailed description when read in light of the accompanying drawing in which:

FIG. 2 is a block diagram of one implementation of the timing recovery circuit used in the receiver of FIG. 1;

FIG. 3 is a block diagram showing the general arrangement of the timing jitter canceller circuit in the receiver of FIG. 1;

DETAILED DESCRIPTION

Figure 1:
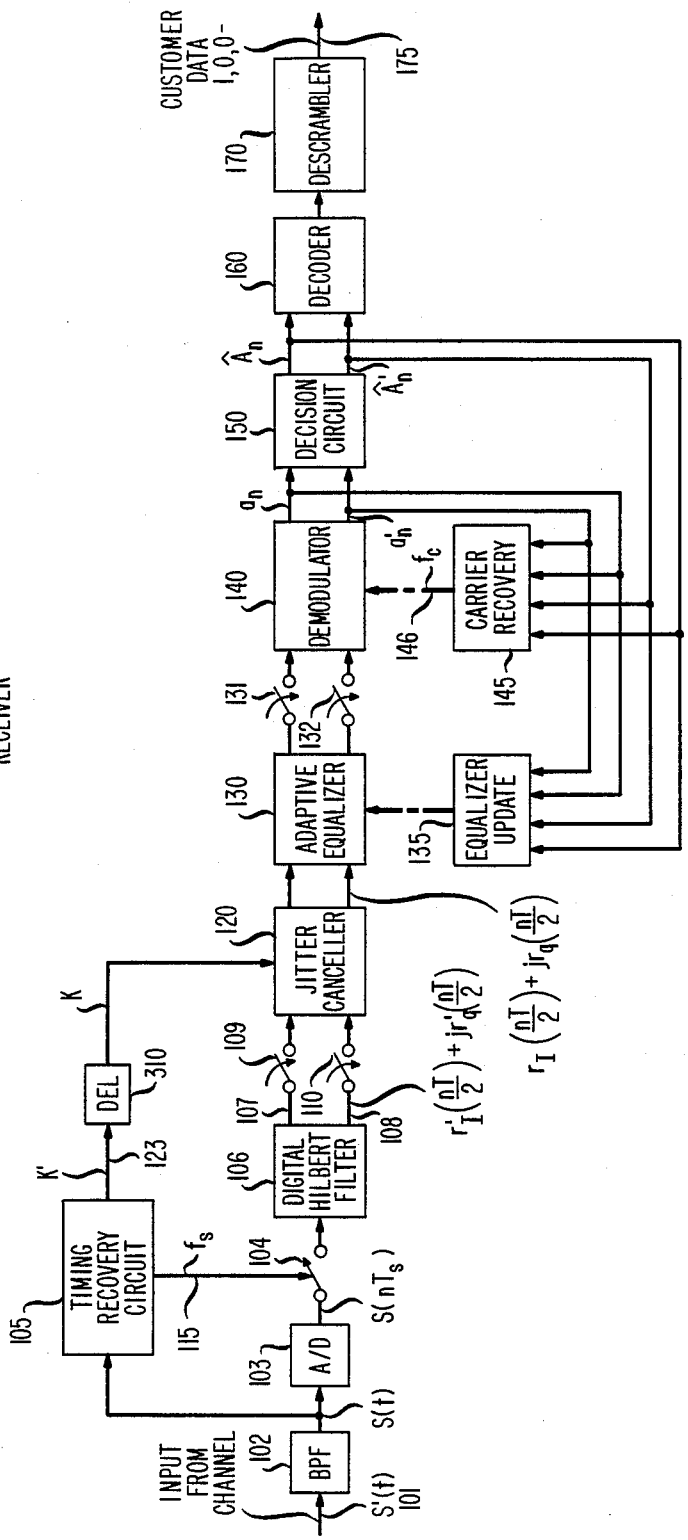
FIG. 1 is an overall block diagram of a data receiver including a timing recovery circuit and a jitter cancellation circuit in accordance with the present invention.

FIG. 1 is an overall block diagram of a data receiver which includes a timing recovery circuit and a jitter canceller circuit in accordance with the present invention. This receiver could be used in a modem designed for a modulated carrier transmission system; other uses for the invention are described below. The signal S(t) received via a transmission channel on line 101 is applied first to a bandpass filter 102 which separates the frequency band of interest. The output S(t) of filter 102 is applied both to an analog-to-digital converter 103 and to a timing recovery circuit 105, which may be arranged as shown in FIG. 2 and as discussed in more detail below. The purpose of timing recovery circuit

105 is to generate a sampling clock signal $f_s$ on line 115 which controls the time at which S(t) is sampled. Diagramatically, control is shown in FIG. 1 by provision of switch 105 which is closed under control of clock signal $f_s$. Generally, $f_s$ must be at least twice the highest frequency contained in the received signal; illustratively, $f_s$ is chosen at 9600 samples per second.

Samples $S(nT_s)$ where $T_s$ represents the assumed sampling period, are output from converter 103 and applied to the input of a digital Hilbert filter 106, which resynthesizes the in-phase and quadrature-phase components of the received signal from its real part $S(nT_s)$ in a manner that is well known to those skilled in the art. These components (on output lines 107 and 108, respectively) are then subsampled at a rate determined by the type of equalizer used; illustratively, subsampling may occur at a rate of 1200 samples per second, corresponding to a T/2 fractionally spaced equalizer, where 1/T represents an assumed symbol rate of 600 symbols per second. Again, for diagramatic purposes, subsampling is accomplished in FIG. 1 via closure of switches 109 and 110.

The in-phase and quadrature-phase components of the analytic signal output from filter 106 are designated $$r_i' \text{ (nT/2) and } r_q' \text{ (nT/2)}$$

respectively, and are applied to jitter cancellation circuit 120 which is at the heart of the present invention. This circuit is intended to remove from the applied signal the effects of phase or timing jitter introduced by timing recovery circuit 105. Its construction and manner of operation will be described more fully below.

The in-phase and quadrature-phase outputs of jitter cancellation circuit 120 are designated $$r_i \text{ (nT/2) and } r_q \text{ (nT/2)},$$

respectively, and are applied to an adaptive equalizer 130 which ideally, removes all intersymbol interference present in the signal as well as all other linear spectral degradations imposed on the signal by the transmission channel. The output of equalizer 130, designated $q_i(nT)$ and $q_g(nT)$, is again subsampled but now at the symbol rate 1/T; subsampling is again diagramatically illustrated by provision of switches 131 and 132. The subsampled output is then applied to demodulator 140 to yield complex information bearing quantities $a_n$ and $a_n'$, respectively. When particular carrier frequencies and sampled rates are used, the equalizer subsampling operation partially performs the demodulation.

The complex demodulated samples $a_n$ and $a_n'$ are applied to a decision circuit 150 which determines what symbol $\hat{A}_n$, $\hat{A}_n'$ in a signalling alphabet used during modulation at the transmitter is closest to the received signal. A decoder 160 then converts each symbol back into its corresponding data bits, which are then applied to a descrambler 170 to provide on line 175 a replica of the original data. Outputs $a_n$ and $a_n'$ from demodulator 140, as well as the outputs $A_n$, $A_n'$ from decision circuit 150, are also applied to an equalizer update circuit 135 which recursively updates coefficients used to perform equalization. See, for example U.S. Pat. No. 4,237,554, issued Dec. 2, 1980 to R. D. Gitlin et al entitled "Coefficient Tap Leakage for Fractionally-Spaced Equalizers", U.S. Pat. No. 4,247,940, issued Jan. 27, 1981 to K. H. Mueller et al entitled "Equalizer for Complex Data Signals", and U.S. Pat. No. Re. 27,047 issued Feb. 2, 1971 to R. W. Lucky entitled "Digital Adaptive Equalizer System" for an explanation of various aspects of adaptive equalization. The same outputs from demodulator 140 and decision circuit 150 are also applied to a carrier recovery circuit 145 to generate a carrier signal $f_c$ on line 146 which is used in demodulator 140. Carrier recovery circuit 145 typically includes a phase locked loop which derives the exact carrier frequency (which may not precisely agree with frequencies generated by a local oscillator) and tracks any phase changes acquired by the received signal due to phase jitter or frequency offset.

FIG. 2 is a block diagram of one arrangement for implementing timing recovery circuit 105 of FIG. 1. A Hilbert filter 201 (similar to filter 106 in FIG. 1) is arranged to receive the output S(t) from bandpass filter 102 and generate in-phase and quadrature-phase components r(t) and jr'(t) on lines 202 and 203, respectively. These signals are squared in circuits 205 and 206, the outputs of which are algebraically combined in adder circuit 207. Squaring is used to obtain the envelope of the signal; Alternatively, fourth power circuits may be employed. (See, for example, *Bell System Technology Journal*, Vol. 57, No. 5, May-June 1978, pp. 1489–1498, "Jitter Comparison of Tones Generated by Squaring and by Fourth Power Circuits," J. E. Mazo.)

The output of adder circuit 207 is applied to a bandpass filter 210 having its passband centered at the symbol frequency. The output of filter 210 is hard limited in limiter 215, the output of which supplies the input to a phase locked loop 220. At this point, the signal has been transformed into a square wave signal of desired amplitude at the symbol frequency.

Various arrangements for phase locked loop 220 may be used, all of which are intended to provide a sampling clock signal $f_s$ on line 115 which controls the sampling performed by analog-to-digital converter 103 of FIG. 1. As shown in FIG. 2, phase locked loop 220 may include a comparator 222 arranged to compare the input received from limiter 215 with clock signal $f_s$ output from counter 224. The difference or error signal generated by comparator 222 is applied to a control circuit 225 which generates an up/down signal K' which controls the operation of a divider circuit 223. This signal can take on the value of ±1, depending on whether the output from counter 224 is leading or trailing the output of limiter 215. Divider circuit 223 also receives a clock signal $f_{clkv}$ from a fixed rate oscillator 221 illustratively at frequency 2.4576 MHZ and divides these pulses by a nominal integral factor, illustratively four. In order to obtain the desired nominal frequency for clock signal $f_s$ and the desired symbol frequency 1/T, the output of divider circuit 223 is applied to a count down chain circuit 224. Once per symbol, however, a correction is made by altering the operation of divider circuit 223 in accordance with the value of K'. If the output of control circuit 225 indicates that a phase advance is required, divider circuit 223 divides the output of oscillator 221 by three; if a retard condition exists, divider circuit 223 switches to division by five.

While the arrangement of phase locked loop 220 ensures the sampling frequency $f_s$ on line 115 tracks the input applied from bandpass filter 102, it is observed that each time an adjustment is made, the time at which the next input sample is taken changes by one period of oscillator 221. This change appears to the receiver as a small phase hit, which reduces the overall receiver performance or gain. Similar problems exist with other implementations of phase locked loop 220.

In order to avoid the problems just discussed, the apparatus and method of the present invention uses information derived from the up/down signal, the frequency $f_{clkv}$ of oscillator 221, as well as the frequency $f_c$ of the recovered carrier to generate a recursively updated correction factor $e^{j\theta_n}$. Each sample output from digital Hilbert filter 106 is then corrected in accordance with the corresponding factor.

A timing jitter cancellation circuit 120 in accordance with the present invention for use with timing recovery circuit of FIG. 2 is shown in FIG. 3. As stated previously, the purpose of circuit 120 is to compensate for the phase hits or jumps which are caused by corrections occurring in timing recovery circuit 105. Such phase hits are "permanent," since each adjustment in the timing loop corresponds to a hit that never recovers. While the magnitude of the phase hit is reduced as the period of $f_{clkv}$ is reduced, the smallest usable period must be consistent with the ability of the receiver to meet CCITT specified tolerances. For a 600 Hz symbol rate, a frequency $f_{clkv}$ near 2.4576 MHz has been found to be reasonable. Even at this high rate (with a period of 407 ns), a phase hit of 0.35 degrees occurs at a 2.4 kHz carrier frequency; this phase jitter is easily visible on the receiver constellation.

The jitter cancellation circuit of FIG. 3 is arranged to correct each sample by performing a complex multiplication of the analytic output $r_q'$ (nt) and $r_I'$ (nt) of Hilbert filter 106 by a correction factor $e^{j\theta_n}$ which is a complex vector of unity magnitude having phase $\theta_n$. Once per symbol interval, at rate 1/T, $\theta_n$ is updated, such that;

$$\theta_{n+1} = \theta_n + k2\pi f_c/f_{clkv} \quad (1)$$

where (as stated previously) k is ±1, depending upon the direction (advance or retard) of the correction occurring in recovery circuit 105, $f_c$ is the nominal carrier frequency used in the receiver, and $f_{clkv}$ is the clock frequency of oscillator 221 within phase locked loop 220. It is thus seen that $k2\pi f_c/f_{clkv}$ is a correction term having a magnitude determined by the amount of discrete phase change introduced into the received signal when the timing recovery circuit adjusts to keep $f_s$ aligned with the input signal. The sign of this quantity depends upon the direction (advance or retard) of the correction.

In FIG. 3, arithmetic circuit 301 is arranged to receive information representing the values of $f_{clkv}$ and $f_c$, as well as a delayed version k of the value of k'. This delay is introduced in order to compensate for the delay incurred in processing within Hilbert filter 106. The phase correction term $\theta n$ for the $n^{th}$ sample generated by circuit 301 on line 303 is also fed back to the input of circuit 301 to generate the correction term $\theta_{n+1}$ for the $(n+1)^{th}$ sample in accordance with Equation (1). The correction term $\theta_n$ is applied to a look up circuit 304 which generates the values of $\sin\theta_n$ and $\cos\theta_n$ on lines 305 and 306, respectively. This enables correction of the output of filter 106 by the $e^{j\theta_n} = \cos\theta_n + j\sin\theta_n$ via a complex multiplication. The outputs of circuit 310, $r_I(nT/2)$ and $r_q(nT/2)$, are used as inputs to adaptive equalizer 130.

Figure 4:
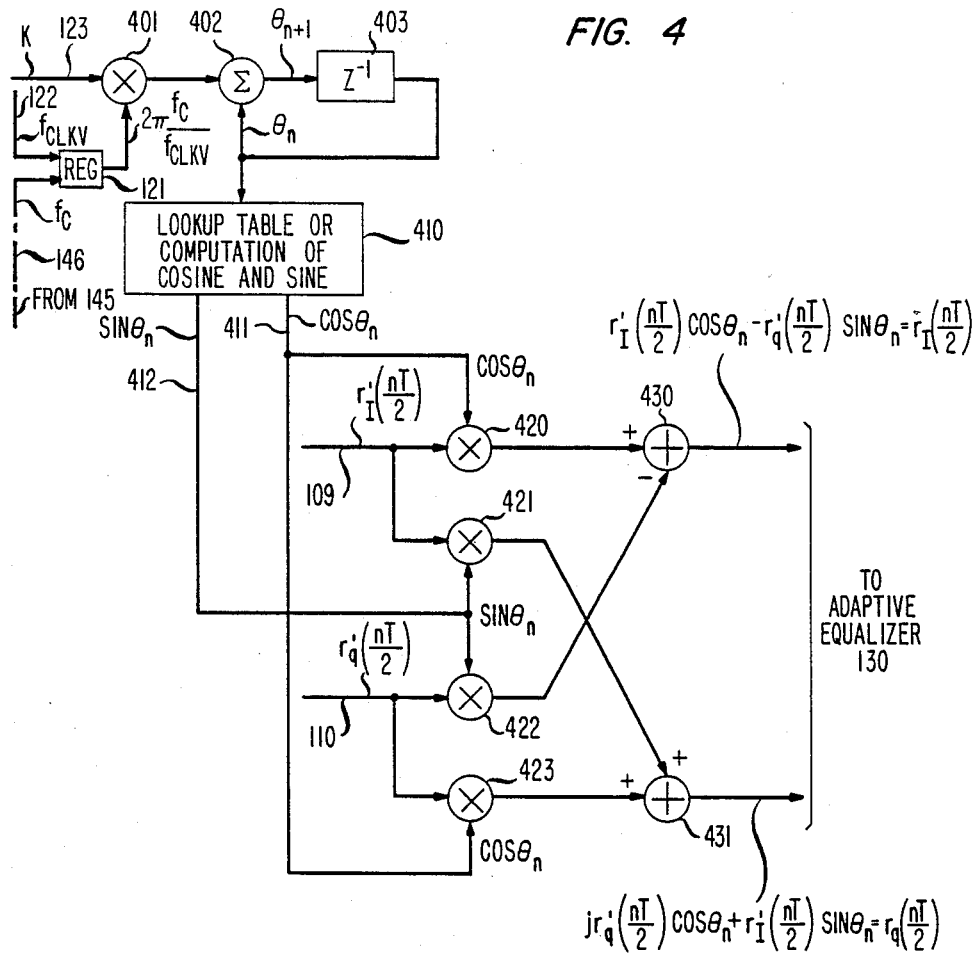
FIG. 4 is a more detailed diagram showing the arrangement of the timing jitter canceller of FIG. 3.

A more detailed illustration of the present invention in block diagram form is found in FIG. 4. As shown, the product of $2\pi f_c/f_{clkv}$ (supplied on line 122 from a register 121) and the value (sign) of k (supplied on line 123) is formed in a multiplier 401 which provides a first input to a summation circuit 402. The second input to circuit 402 is the value of the phase correction term $\theta_n$ for the $n^{th}$ sample stored in a one sampled delay element 403. Thus, in accordance with equation (1), the output of summation circuit 402 provides the updated value $\theta_{n+1}$ of the correction term for the $(n+1)^{th}$ sample.

The current value of $\theta_n$ is applied to a read only memory 410 which operates as a look-up table in order to derive the values of $\sin\theta_n$ and $\cos\theta_n$ on lines 412 and 411, respectively. The value of $\sin\theta_n$ is extended to first inputs of multipliers 421 and 422, while the value of $\cos\theta_n$ is extended to first inputs of multipliers 420 and 423. Second inputs to multiplier 420 and 421 are derived from the output of switch 109 and represent the value of $r_I'$ (nT/2) Second inputs to multipliers 422 and 423 represent $r_q'$ (nT/2) output of switch 110. The outputs of multipliers 420 and 422 are algebraically combined in a first adder circuit 430 such that $r_I$ (nT) is given by:

$$r_I'(nT/2)\cos\theta_n - r_q'\sin\theta_n = r_I(nT/2) \quad (2)$$

In like fashion, the outputs of multipliers 421 and 423 are combined in an algebraic combining circuit 431 to yield $r_q(nT)$ which is given by $$j\,r_q'(nT/2)\cos\theta + r_I'(nT/2)\sin\theta_n = r_q(nT/2) \quad (3)$$

The outputs of circuits 430 and 431 represent the complex product of each sample and the corresponding correction factor and provide the inputs to adaptive equalizer 130 of FIG. 1.

Figure 5:
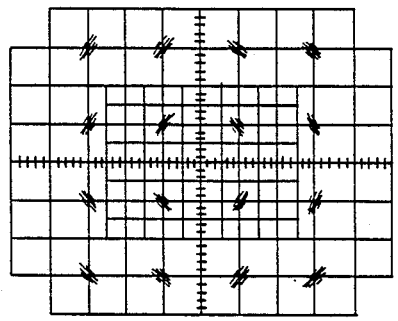
FIG. 5 is a drawing of the received signal constellation showing timing jitter which occurs in conventional receivers.
Figure 6:
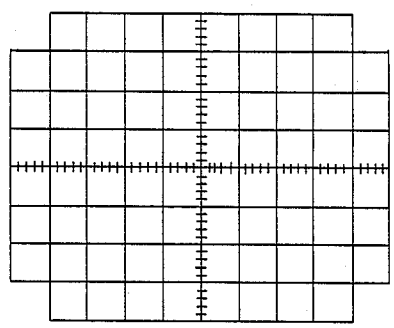
FIG. 6 is a drawing similar to FIG. 5 showing the constellation when jitter cancellation in accordance with the invention is used.
Figure 7:
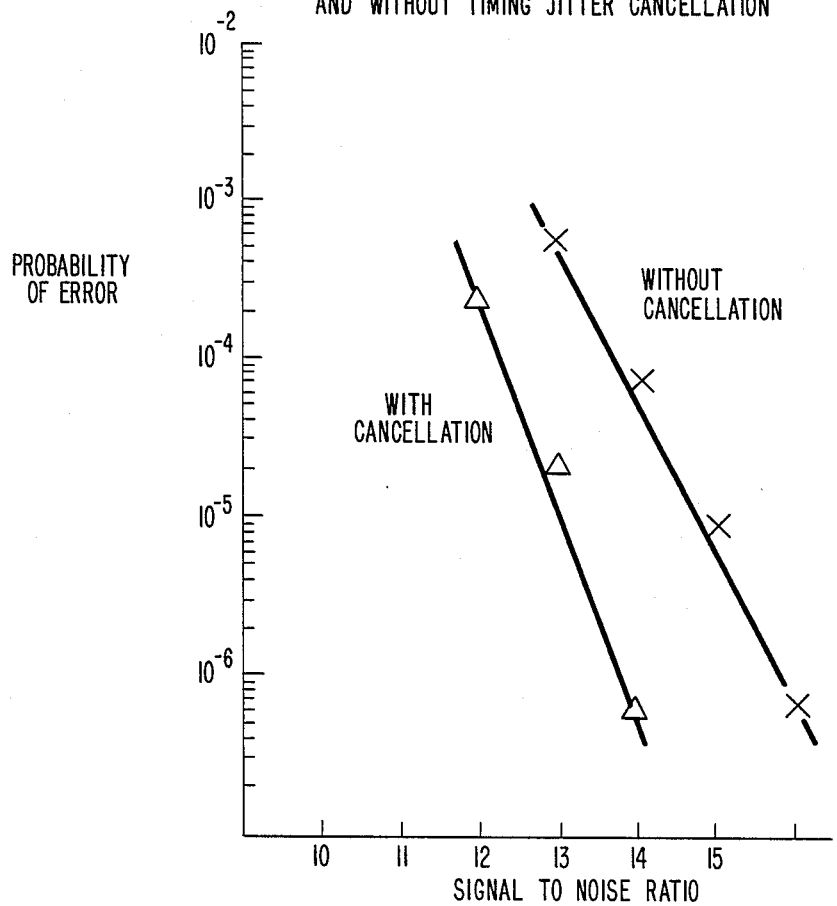
FIG. 7 is a graph showing the results of bit error rate tests with and without timing jitter cancellation in accordance with the present invention.

FIGS. 5 and 6 show the receiver constellations with correction in accordance with the present invention (FIG. 6) and without jitter cancellation (FIG. 5). As can be clearly seen, significant reduction in divergence is attained by use of the method and apparatus described above. FIG. 7 illustrates the bit error rate observed with and without jitter cancellation. As can be seen, about 2 dB in signal-to-noise ratio improvement was attained.

The present invention is most useful when low symbol rates are employed, because timing changes then occur at a slower rate, resulting in larger step size changes in the output of timing recovery circuit 105. The invention is also most useful in situations in which large variations in clock frequency drift are expected. In most DDD applications where communications occur between modems of different manufacturers, such large variation can be expected.

Various adaptations and modifications of the present invention can be made by those skilled in the art without departing from the spirit and scope of the invention. Accordingly, it is intended that the invention be limited only by the following claims. For example, in FIG. 1 it is possible to locate the timing jitter canceller 120 at the output of adaptive equalizer 130 rather than proceeding its input. However, with this modification, the delay occasion by processing in the equalizer must be estimated such that the value of K used in circuit 120 corresponds to the value used to control sampling of the output of analog-to-digital converter 103. It is also possible to use an analog Hilbert filter instead of digital Hilbert filter 106 of FIG. 1. In this event, A/D converters, placed after the Hilbert filter instead of using converter 103, sample at rate $f_s/2$. With this modification, delay element 310 is adjusted accordingly or eliminated.

What is claimed is:

1. In a data receiver arranged to sample a received signal at sampling instants determined by a timing recovery circuit, apparatus for compensating for errors introduced in said receiver, said errors occurring as a result of adjustments to said sampling instants made by said timing recovery circuit, including first means responsive to said timing recovery circuit for recursively updating a correction factor in accordance with each of said adjustments made with respect to each sample of said received signal, and second means for forming a series of compensated samples having values which compensate for said errors, each of said compensated samples being a function of the product of each of said samples and said correction factor.

2. The invention defined in claim 1 wherein said correction factor is a unity magnitude vector having a phase which is a function of the magnitude and phase of said timing adjustment.

3. The invention defined in claim 2 wherein said timing recovery circuit includes a phase locked loop comprising (a) a local oscillator of frequency $f_{clkv}$;
(b) a divider circuit for dividing the output of said local oscillator by an integral value to obtain a sampling clock signal of frequency $f_s$;
(c) means for comparing said sampling clock signal frequency with the frequency of samples of said received signal, and
(d) means responsive to the output of said comparing means for generating a control signal K operative to change said integral value, and wherein said correction factor is given by $$K 2\pi \frac{f_c}{f_{clkv}},$$

where $f_c$ is the carrier frequency of said received signal, and where K is a constant whose sign depends upon the direction (advance or retard) of said timing adjustment.

4. Apparatus for reducing timing jitter in samples of a received data signal including timing recovery means responsive to said received data signal for generating a sampling clock signal by making periodic adjustments to a local clock signal, means for forming samples of said received signal in response to said sampling clock signal, means jointly responsive to said periodic adjustments made by said timing recovery means and a previous correction factor for generating an updated correction factor, and means for correcting each of said samples in accordance with a corresponding updated correction factor.

5. The invention defined in claim 4 wherein said means for making periodic adjustments is arranged to advance or retard said local clock signal by a predetermined increment.

6. The invention defined in claim 5 wherein said correcting means includes means for forming the complex product of each of said samples and said corresponding correction factor.

7. The invention defined in claim 6 wherein said correction factor is a unity magnitude quantity $e^{\theta n}$ having a phase which is a function of $$2\pi K \frac{f_c}{f_{clkv}},$$

where K is a constant whose sign depends upon the direction (advance or retard) of said periodic adjustment, and $$2\pi \frac{f_c}{f_{clkv}}$$

is a function of the magnitude of said predetermined increment.

8. A method of reducing timing jitter in samples of a received data signal including the steps of generating a sampling clock signal in a timing recovery circuit by making periodic adjustments to a local clock signal, forming samples of said received signal in response to said sampling clock signal, generating an updated correction factor jointly in response to said periodic adjustments and a previous correction factor, and correcting each of said samples in accordance with a corresponding updated correction factor.

9. The method defined in claim 8 wherein said periodic adjustments are made by advancing or retarding said local clock signal by a predetermined increment.

10. The method defined in claim 9 wherein said correcting step includes forming the complex product of each of said samples and said corresponding correction factor.

11. The method defined in claim 10 wherein said correction factor is a unity magnitude quantity $e^{\theta n}$ having a phase which is a function of $$2\pi K \frac{f_c}{f_{clkv}},$$

where K is a constant whose sign depends upon the direction (advance or retard) of said periodic adjustment, and $$2\pi \frac{f_c}{f_{clkv}}$$

is a function of the magnitude of said predetermined increment.

12. Apparatus for reducing jitter introduced in samples of a received data signal, said samples taken at sampling instants under the control of a timing recovery circuit, said timing recovery circuit including means which generates a discrete adjustment to an otherwise regular timing sequence at which said sampling instants occur, said apparatus including means responsive to said timing recovery circuit for generating a correction signal in order to correct errors caused by said discrete adjustments to said timing sequence, and means for altering the values of said samples as a function of said correction signal.

13. Apparatus for processing samples of a received data signal to reduce jitter introduced into said samples as a result of adjustments to the time interval in which successive ones of said samples are taken, said apparatus including means responsive to said timing recovery circuit for generating a correction signal in order to correct errors caused by said adjustments of said time intervals, and means for altering the values of said samples as a function of said correction signal.

14. Apparatus for correcting the phase of a received data signal to reduce errors introduced into said signal that are caused by discrete adjustments that are made to the timing sequence in which said data signal is samples, said apparatus including means responsive to said timing recovery circuit for generating a correction signal in order to correct errors caused by said discrete adjustments of said timing sequence, and means for altering the values of said samples as a function of said correction signal.

* * * * *